United States Patent [19]

Schmohe et al.

[11] 4,161,668
[45] Jul. 17, 1979

[54] EXCITER COOLING ARRANGEMENT FOR DYNAMOELECTRIC MACHINES

[75] Inventors: James S. Schmohe; Ronald C. Van Kessel, both of Rockford, Ill.

[73] Assignee: Sundstrand Corporation, Rockford, Ill.

[21] Appl. No.: 813,016

[22] Filed: Jul. 5, 1977

Related U.S. Application Data

[63] Continuation of Ser. No. 635,499, Nov. 26, 1975, abandoned.

[51] Int. Cl.² .............................................. H02K 11/00
[52] U.S. Cl. .................................... 310/68 D; 310/58
[58] Field of Search ................. 310/165, 68, 65, 68 D, 310/61, 58, 72, 59, 91, 60, 60 A

[56] References Cited

U.S. PATENT DOCUMENTS

| | | | |
|---|---|---|---|
| 3,145,314 | 8/1964 | Becker | 310/68 R |
| 3,733,503 | 5/1973 | Potter | 310/68 R |
| 3,829,725 | 8/1974 | Petersen | 310/72 |
| 3,858,069 | 12/1974 | Kuter | 310/68 D |
| 3,965,379 | 6/1976 | Meusel | 310/59 |

FOREIGN PATENT DOCUMENTS 1068817  11/1959  Fed. Rep. of Germany ........ 310/68 D Primary Examiner—R. Skudy
Attorney, Agent, or Firm—Ted E. Killingsworth; Michael B. McMurry; William R. Peoples

[57] ABSTRACT

In a dynamoelectric machine having an exciter assembly mounted on a rotating shaft including: rectifiers for rectifying AC exciter current into a DC field current; a hub secured to the shaft; and a number of rectifier mounting plates attached to the hub, each plate having apertures through which individual rectifiers are mounted, the cooling of the exciter assembly and the rectifier diodes is facilitated by an oil spray impinging directly on the rectifier diodes and mounting plates wherein the cooling is enhanced and sludge build-up on the inner surface of the hub is reduced by providing coolant passageways in the rectifier mounting plates that allow the oil to pass through the plates.

4 Claims, 2 Drawing Figures

EXCITER COOLING ARRANGEMENT FOR DYNAMOELECTRIC MACHINES

CROSS REFERENCE TO RELATED APPLICATION

This application is a continuation of Ser. No. 635,499 filed on Nov. 26, 1975 now abandoned.

BACKGROUND OF THE INVENTION

The invention relates to cooling systems for dynamoelectric machines and more particularly, to the cooling of exciter assemblies having rotating rectifier diodes.

In dynamoelectric machines, particularly synchronous generators having exciter assemblies which include rotating exciter windings along with rectifier diodes for converting the AC current generated in the exciter windings into a DC field current, effective cooling of the exciter assembly is of great importance. This is especially true for certain classes of synchronous generators such as high speed aircraft generators, where the operating environment is restricted and weight requirements are critical.

One particularly effective approach to cooling the exciter assembly and rectifier diodes is to have a coolant, such as oil, sprayed directly on the rectifier diodes. In one type of synchronous generator the diodes are supported by plates which are in turn secured to a hub which rotates with the generator shaft. The hub also serves to support the rotating exciter windings. However, since the cooling oil generally contains minute particles of metal and other substances, the centrifugal force resulting from the rotation of the hub will tend to cause accumulations of the metals and the other substances to build up on the inner surface of the hub. Practical experience has shown that the sludge build-ups can become large enough that they will short the plates to the hub, causing a short circuit and thus, the failure of the generator. As a result, it has become extremely important, from a practical standpoint, to provide means for eliminating this type of sludge build-up while maintaining efficient cooling.

SUMMARY OF THE INVENTION

It is therefore an object of the invention to provide enhanced cooling means for a dynamoelectric machine exciter structure having rectifier mounting plates attached to a hub, which in turn is secured to the machine's rotating shaft, wherein cooling and sludge removal is enhanced by providing a plurality of passageways to permit cooling oil, that impinges directly upon the rectifier diodes and mounting plates, to flow past the inner surface of the hub, thereby reducing sludge and particle build-ups.

It is a further object of the invention to provide an improved exciter cooling arrangement for a synchronous machine having an exciter assembly attached to the machine's rotating shaft by means of a hub and further including a plurality of rectifier diodes attached to the hub by means of mounting plates and further having cooling oil impinging directly upon the rectifier diodes and mounting plates, wherein cooling is enhanced by a plurality of passageways in the mounting plates where the passageways are located radially further from the center line of the shaft than the inside surface of the hub.

DETAILED DESCRIPTION OF THE INVENTION

Figure 1:
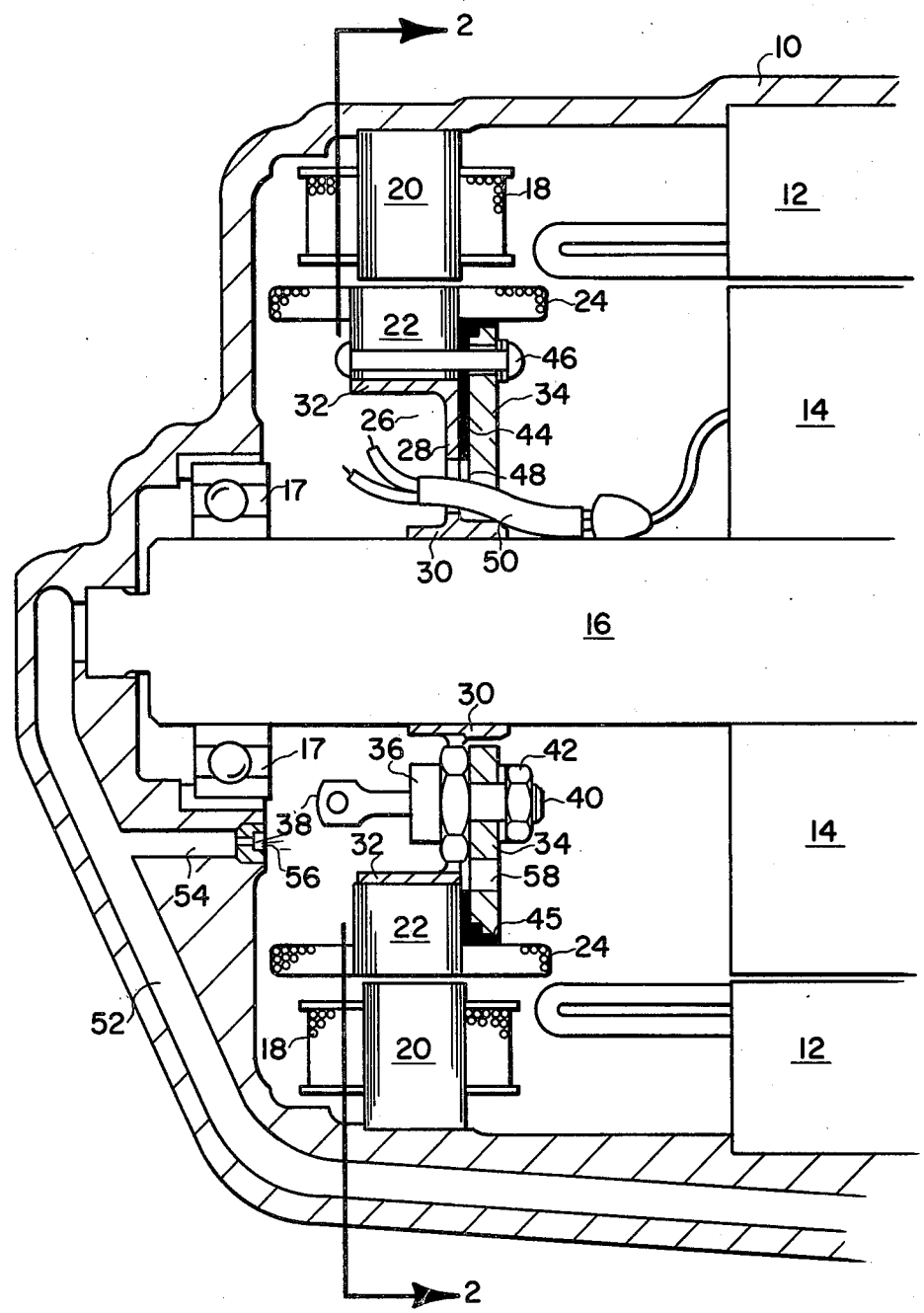
FIG. 1 is a longitudinal sectional view of a dynamoelectric machine.

In FIG. 1 of the drawings a sectional view of a synchronous generator is provided with 10 indicating the generator housing. As is conventional for synchronous dynamoelectric machines, armature coils, indicated generally by the reference numerals 12, are attached to the housing 10, and rotating main field windings and core 14 are attached to a rotating shaft 16. The shaft 16 is supported at the end of the housing 10 by the bearing 17.

Figure 2:
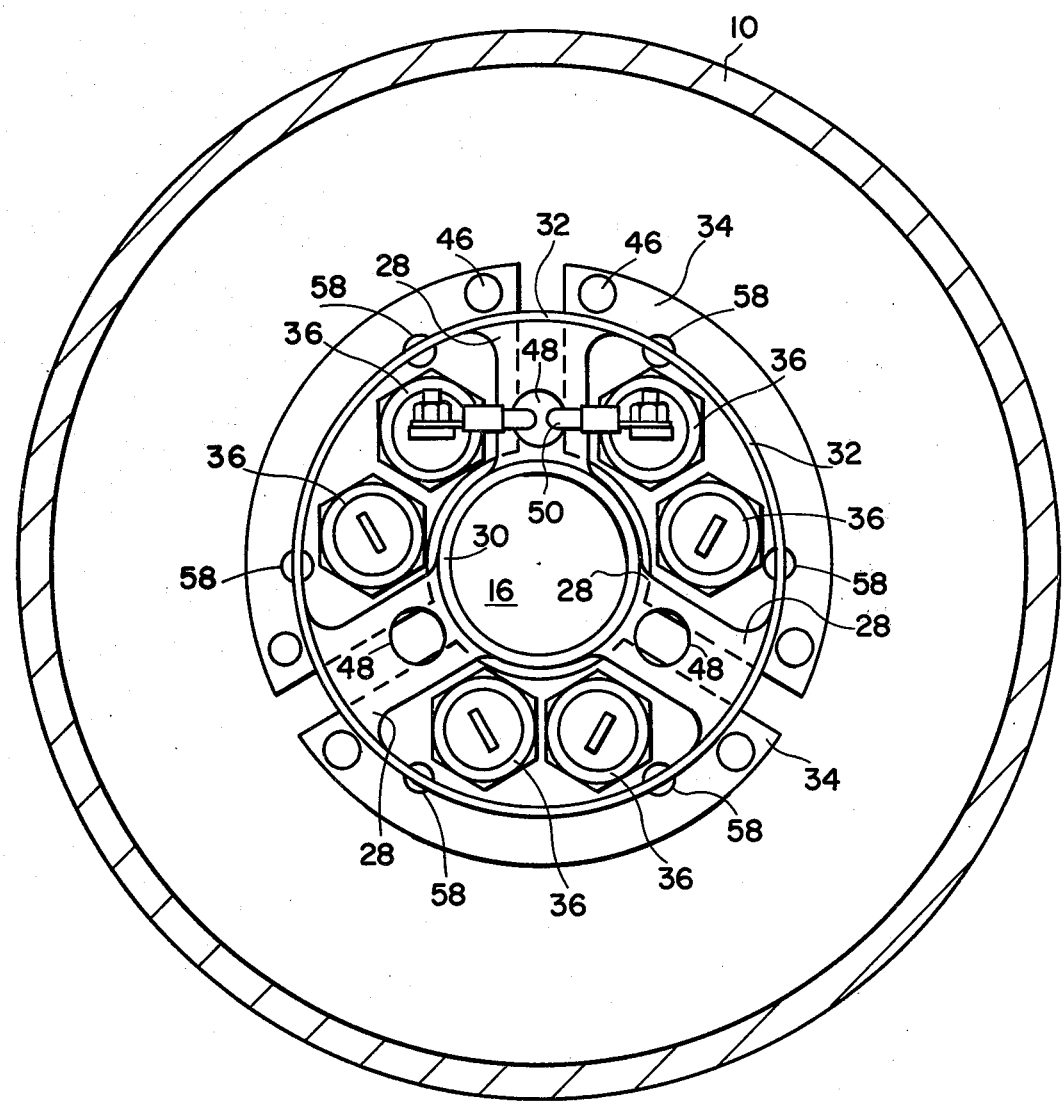
FIG. 2 is a cross-sectional view of the dynamoelectric machine taken along section lines 2—2 of FIG. 1.

In addition, a plurality of exciter field windings, indicated by the reference numerals 18 and their associated cores 20, are spaced about the circumference of the generator housing 10 and secured thereto. Rotating past the exciter field cores 20 are a plurality of exciter cores 22 and windings 24. The exciter cores 22 and windings 24 are attached to the shaft 16 by means of a hub structure indicated generally in the upper portion of FIG. 1 by the reference numeral 26. The hub 26, as illustrated in FIG. 2, includes three angularly spaced support members 28 which extend outwardly from a collar 30, which is secured to the shaft 16. Typically, the collar 30 is pressed on the shaft 16 so that the hub 26 will rotate with the shaft 16. The hub 26 also includes a circular rim member 32 attached to the support members 28 and concentric with the shaft 16. Also, in the synchronous generator shown in FIG. 1, the rotating field cores 22 are secured to the outer portion of the circular member 32. For simplicity, the rotating exciter cores 22 and windings 24 are not shown in FIG. 2, nor are the exciter field core 20 and windings 18.

Also attached to the hub support members 28 are a plurality of angularly spaced conductive rectifier mounting plates 34. As shown in FIG. 2, there are three mounting plates 34, each of which is configured with two apertures for holding rectifier diodes 36. Each diode 36 includes a terminal portion 38 and a stud 40 which extends through the mounting plate 34 for attaching the rectifier diode 36 to the mounting plate 34 by means of a nut 42. The mounting plate 34 is electrically insulated from the hub 26 by means of the insulating material shown at 44 and 45 of FIG. 1.

In addition, the exciter core 22 is secured typically by a press fit to the outer surface of the circular member 32. The fastening device 46 serves to attach the mounting plate 34 to the core 22. It should also be noted that in this particular embodiment, each of the support members 28 contains an aperture 48 through which electrical connectors 50 extend, serving to electrically connect the rectifier diodes 36 to the generator's main field 14.

In order to adequately cool the generator, a supply of cooling oil is received from an outside source through a conduit 52. A portion of the coolant that is being delivered to the generator through conduit 52 is directed through a branch conduit 54 which extends through the generator housing 10 in a position approximately the same radial distance from the generator shaft 16 as the rotating rectifier diodes 36. As the diodes 36 and the rectifier mounting plates 34 rotate past the conduit 54, a spray of coolant is forced under pressure through an orifice 56 axially directly upon the rectifier diodes 36 and mounting plates 34. Since the rectifier diodes 36 generate significant amounts of heat and are of a semiconductor material, it is very important to keep them as cool as possible, to maintain long life and optimum performance. By spraying the coolant directly on the diodes 36 and the mounting plates 34, that also serve as heat sinks for diodes, the maintenance of specified temperature limits for the diodes within the generator is greatly facilitated.

In order to prevent sludge, including metal particles, from building up on the inner surface of the circular rim member 32 due to the centrifugal force resulting from the spinning hub, a plurality of angularly spaced coolant apertures 58 are included in the mounting plates 34. As shown in FIGS. 1 and 2, these coolant apertures are in axial alignment with the circular member 32 so that a portion of the aperture is disposed radially inwardly relative to the circular rim member and a portion of the aperture is disposed radially further away from the center line of the shaft 16 than the circular rim member 32 and in close proximity to the diodes 36. Locating the coolant passageways 58 in this manner permits the coolant to traverse the inner portion of the circular member 32, due to the axially directed spray, thereby preventing the build-up of sludge and other undesired particles and enhancing the cooling effects of the oil. Coolant in the generator housing 10 ultimately falls by gravity to the bottom of the housing where it may be withdrawn by appropriate means.

We claim:

1. A rectifier support structure for dynamoelectric machines having rectifiers secured to a rotating shaft within a housing wherein an oil coolant is sprayed from a source at one end of the housing directly on the rectifiers, comprising:
   a hub structure including at least one support member secured to and rotatable with the shaft and a circular rim member secured to said support member and concentric with the shaft;
   at least one plate secured to said hub structure wherein the plane of said plate is perpendicular to the axis of the shaft and configured with apertures suitable to receive the rectifiers;
   insulating means interposed between said hub structure and said plate for electrically insulating said plate from said hub; and
   a plurality of coolant apertures configured in said plate effective to permit at least a portion of the coolant to flow in a direction parallel to the axis of the shaft through said plates wherein each of said coolant apertures is located in axial alignment with the circular rim member and with a portion of the aperture disposed radially inwardly relative to the circular rim member and a portion of the aperture disposed radially further away from the center line of the rotating shaft than said circular rim member thereby being effective to reduce sludge build-up on said circular member.

2. In a dynamoelectric machine having a rotating exciter assembly including rectifiers mounted on a shaft within a housing wherein an oil coolant supplied from a source at one end of the housing impinges directly on the diodes, a rectifier support structure comprising:
   a collar secured to the machine's rotating shaft;
   angularly spaced support members secured to said collar;
   a circular rim member secured to said support members and concentric with the shaft;
   a plurality of exciter coil structures secured to the outer periphery of said circular rim member;
   angularly spaced rectifier mounting plates, each configured with apertures for supporting the rectifiers;
   fastening means for securing said mounting plates to said exciter coil structures wherein the plane of said mounting plates is perpendicular to the axis of the shaft; and
   a plurality of angularly spaced coolant apertures configured within said mounting plates effective to permit at least a portion of the coolant to flow in a direction parallel the axis of the shaft through said mounting plates wherein said coolant apertures in said mounting plates are each located in axial alignment with the circular rim member and with a portion of the apertures disposed radially inwardly relative to the circular rim member and a portion of the aperture disposed radially further away center line of the shaft than said circular rim member thereby being effective to reduce sludge build-up on said circular rim member.

3. The structure of claim 2 wherin said coolant apertures include circular apertures in said mounting plates.

4. The structure of claim 3 wherein each of said mounting plates includes two of said coolant apertures located in close proximity to the rectifier diodes to prevent sludge accumulation adjacent the diodes.

* * * * *